(12) United States Patent
Okuwaki

(10) Patent No.: US 6,641,498 B2
(45) Date of Patent: Nov. 4, 2003

(54) APPARATUS FOR CONTROLLING TEMPERATURE OF FLUID IN POWER-TRANSMISSION SYSTEM AND METHOD OF CONTROLLING TEMPERATURE OF FLUID IN POWER-TRANSMISSION SYSTEM

(75) Inventor: Shigeru Okuwaki, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/125,356

(22) Filed: Apr. 19, 2002

(65) Prior Publication Data

US 2002/0155922 A1 Oct. 24, 2002

(30) Foreign Application Priority Data

Apr. 24, 2001 (JP) ........................................ 2001-126600

(51) Int. Cl.[7] ............................................... F16H 31/00
(52) U.S. Cl. ......................................... 475/117; 477/98
(58) Field of Search ............................. 475/117; 477/98

(56) References Cited

U.S. PATENT DOCUMENTS

| | | |
|---|---|---|
| 4,680,928 A | 7/1987 | Nishikawa et al. |
| 4,962,678 A | 10/1990 | Murano et al. |
| 4,964,317 A | 10/1990 | Murano et al. |
| 5,042,323 A | 8/1991 | Murano et al. |
| 5,069,084 A | 12/1991 | Matsuno et al. |
| 5,115,694 A | 5/1992 | Sasaki et al. |
| 5,275,069 A | 1/1994 | Baba et al. |
| 5,803,863 A | 9/1998 | Hayward et al. |
| 5,961,419 A | 10/1999 | Hisano et al. |

FOREIGN PATENT DOCUMENTS

| | | |
|---|---|---|
| DE | 195 12 783 A1 | 10/1996 |
| DE | 197 49 334 A1 | 5/1998 |
| JP | 62-251566 | 11/1987 |
| JP | B2 2631372 | 2/1989 |
| JP | B2 2961316 | 5/1989 |
| JP | B2 7-109233 | 6/1989 |
| JP | A 4-272566 | 9/1992 |
| JP | A 7-119817 | 5/1995 |
| JP | 8-14368 | 1/1996 |
| JP | A 10-71837 | 3/1998 |
| JP | A 10-77834 | 3/1998 |

*Primary Examiner*—Dirk Wright
(74) *Attorney, Agent, or Firm*—Oliff & Berridge, PLC

(57) ABSTRACT

A control apparatus controls the temperature of hydraulic fluid in a power-transmission system that has a hydrodynamic power-transmission system designed to transmit power between one rotational member and the another rotational member and that has a transmission coupled to the another rotational member in such a manner that power can be transmitted. The temperature of the hydraulic fluid can be controlled by controlling a subsystem associated with the power-transmission system while a vehicle is coasting.

24 Claims, 8 Drawing Sheets

FIG. 5

| | SPEED-CHANGE STAGE | C1 | C2 | C3 | B1 | B2 | B3 | F1 | F2 |
|---|---|---|---|---|---|---|---|---|---|
| R | REVERSE | | | ○ | | | ○ | | |
| D | FIRST SPEED | ○ | | | | | | | ○ |
| D | SECOND SPEED | ○ | ○ | | | | | | |
| D | THIRD SPEED | ○ | ○ | | | ○ | | ○ | |
| D | FOURTH SPEED | | | | ○ | ○ | | | |
| 2 | FIRST SPEED | ○ | | | | | | | ○ |
| 2 | SECOND SPEED | ○ | | | ○ | ○ | | ○ | ○ |
| L | FIRST SPEED | ○ | | | | | ○ | | ○ |

APPARATUS FOR CONTROLLING TEMPERATURE OF FLUID IN POWER-TRANSMISSION SYSTEM AND METHOD OF CONTROLLING TEMPERATURE OF FLUID IN POWER-TRANSMISSION SYSTEM

INCORPORATION BY REFERENCE

The disclosure of Japanese Patent Application No. 2001-126600 filed on Apr. 24, 2001 including the specification, drawings and abstract is incorporated herein by reference in its entirety.

BACKGROUND OF THE INVENTION

1. Field of Invention

The invention relates to an apparatus for controlling the temperature of a fluid in a power-transmission system, and to a method of controlling the temperature of the fluid.

2. Description of Related Art

In one of known power trains, a transmission is provided via a hydrodynamic power-transmission system on the output side of a vehicular engine. This hydrodynamic power-transmission system is designed to transmit power between one rotational member and the other rotational member by means of the kinetic energy of hydraulic fluid. An oil passage for hydraulic fluid used in the hydrodynamic power-transmission system is connected to an oil passage on the side of the transmission. The same hydraulic fluid is used in the hydrodynamic power-transmission system and the transmission.

Even if torque fluctuations occur in a driving-power source in the hydrodynamic power-transmission system, they are absorbed or alleviated due to the slippage occurring between one rotational member and the other rotational member. However, hydraulic fluid possesses the property of increasing in viscosity in proportion to a decrease in temperature. Therefore, the shearing resistance of hydraulic fluid resulting from a difference between a speed of one rotational member and a speed of the other rotational speed increases in the surroundings of low outside air temperatures. Thus, the amount of power loss in the driving-power source resulting from the shearing resistance of hydraulic fluid, namely, the amount of power loss resulting from a dragging torque increases. This constitutes the cause of a deterioration in fuel consumption.

Japanese Patent Laid-Open Publication No. 10-77834 discloses an engine cooling system capable of solving such a problem. The system disclosed in this publication is designed such that coolant for a water-cooled engine circulates through a coolant circuit with the aid of a water pump. The engine drives the water pump. The coolant circuit extends through the engine. A heat-accumulating tank for thermally insulating and storing coolant that has circulated through the engine is provided. In addition, a heat exchanger is disposed downstream of the heat-accumulating tank in the direction in which coolant flows through the coolant circuit.

The aforementioned cooling system is designed such that the engine is cooled through transmission of heat from the engine to coolant and the coolant that has been heated through transmission of heat from the engine is stored in the heat-accumulating tank.

In addition, coolant in the heat-accumulating tank warms engine oil and hydraulic fluid for the hydrodynamic power-transmission system if the hydraulic fluid is at a low temperature, for example, immediately after the engine has been started. As a result, the viscosity of engine oil for lubricating moving parts of the engine and the viscosity of hydraulic fluid for the hydrodynamic power-transmission system decreases, whereby it becomes possible to reduce frictional loss and thus achieve an improvement in fuel consumption.

However, since the cooling system disclosed in the aforementioned publication requires a heat-accumulating tank, the number of parts required for the system is great. This leads to a problem of structural complication of the system as well as an increase in weight, size, and cost of the system.

SUMMARY OF THE INVENTION

It is an objective of the invention to provide a device capable of controlling the temperature of fluid for a power-transmission system without increasing the number of parts required for the device.

A first aspect of the invention relates to a control apparatus capable of controlling a temperature of fluid. The control apparatus includes a power-transmission system. The control apparatus is provided with temperature controller that controls a temperature of fluid supplied to the power-transmission system by controlling a sub-system associated with functions of the power-transmission system while a vehicle is coasting. The fluid includes hydraulic fluid in a hydrodynamic power-transmission system and lubricant in the transmission.

In the first aspect of the invention, since the temperature of fluid is adjusted by controlling the sub-system while the vehicle is coasting, the temperature of fluid can be controlled without the necessity of providing a specially designed heat-accumulating device. Accordingly, there is no need to increase the number of parts in addition to the original system. Thus, it is possible to prevent structural complication of the system and suppress an increase in weight, size, and cost of the system. In addition, since the sub-system associated with the functions of the power-transmission system is controlled when the vehicle is coasting, the acceleration performance of the vehicle remains unaffected.

A second aspect of the invention relates to a method of controlling a temperature of fluid for a power-transmission system. This method comprises a first step of supplying the fluid to the power-transmission system, a second step of determining whether or not a vehicle is coasting, and a third step of controlling a sub-system associated with functions of the power-transmission system so as to control a temperature of the fluid if it is determined that the vehicle is coasting.

In the second aspect of the invention, the sub-system associated with the functions of the power-transmission system is controlled in the third step so as to adjust a temperature of fluid while the vehicle is coasting. Therefore, the temperature of fluid can be controlled without the necessity of providing a specially designed heat-accumulating device. Accordingly, there is no need to increase the number of parts in addition to the original system. Thus, it is possible to prevent structural complication of the device and suppress an increase in weight, size, or cost of the device. In addition, since the sub-system associated with the functions of the power-transmission system is controlled when the vehicle is coasting, the acceleration performance of the vehicle remains unaffected.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 5 is a chart showing how shift positions, speed-change stages, and operational states of frictional engagement elements are related to one another in a transmission shown in FIG. 2;

DETAILED DESCRIPTION OF PREFERRED EMBODIMENTS

Figure 2:
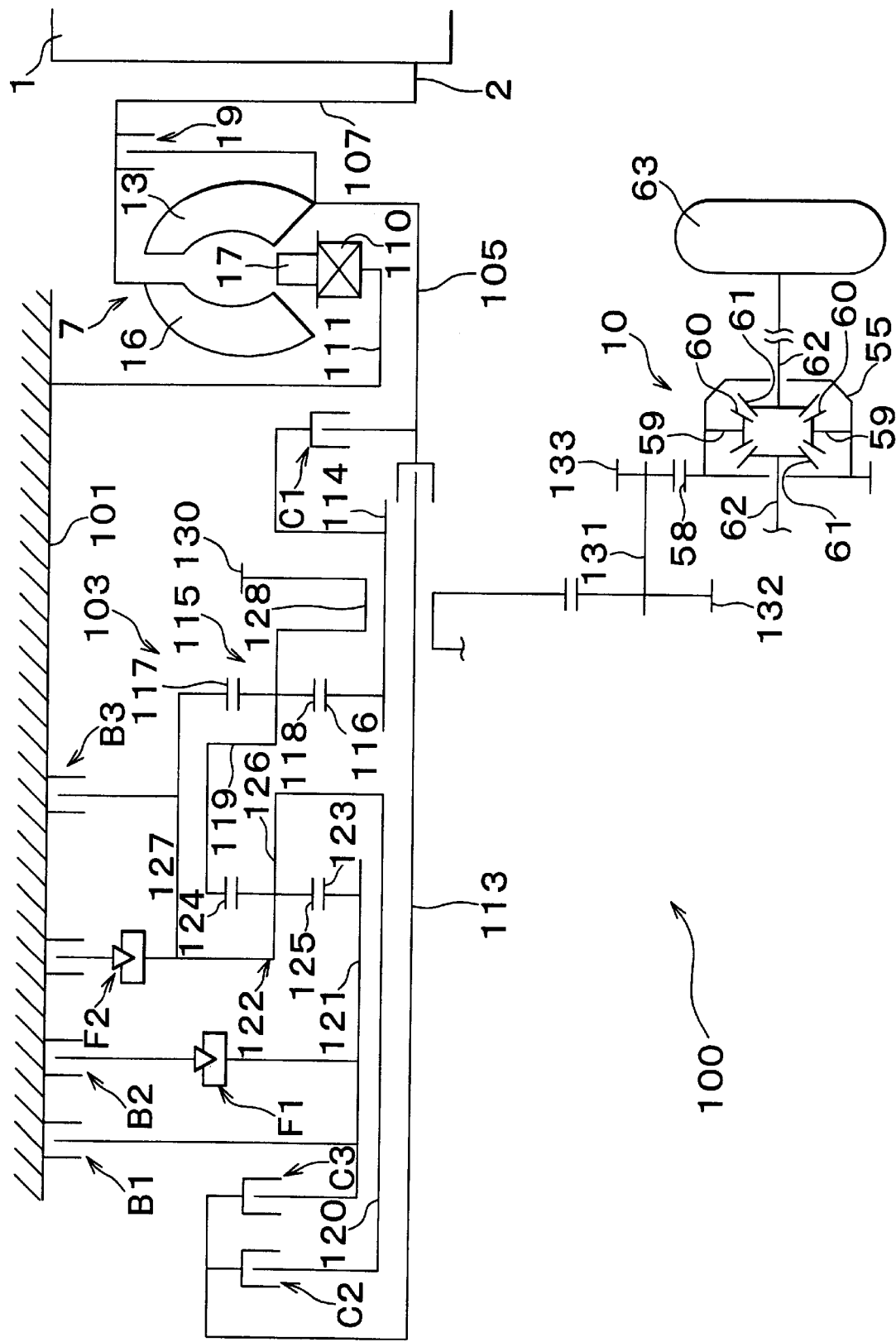
FIG. 2 is a schematic diagram of a power train that is designed to be controlled according to the control example shown in FIG. 1.

Embodiments of the invention will now be described with reference to the drawings. FIG. 2 is a schematic diagram of a power train of a front-engine front-drive vehicle (FF vehicle) to which the invention is applied. An engine 1 shown in FIG. 2 is an internal combustion engine. More specifically, the engine 1 is a gasoline engine, a diesel engine, an LPG engine, or the like. A crank shaft 2 of the engine 1 is disposed in such a manner as to extend in the lateral direction of the vehicle. For convenience, the following description deals with a case where the engine 1 is a gasoline engine.

A transaxle 100 is provided on the output side of the engine 1. The transaxle 100 is a unit including an integral-type casing 101 into which a torque converter 7, a transmission 103, and a final reducer 10 are integrated.

The construction of the torque converter 7 will now be described. An input shaft 105 that can rotate coaxially with the crank shaft 2 is disposed inside the casing 101. A turbine runner 13 is mounted to the input shaft 105 at its end on the side of the engine 1. A front cover 107 is coupled to the crank shaft 2 at its rear end. A pump impeller 16 is connected to the front cover 107. The turbine runner 13 and the pump impeller 16 are disposed facing each other. A stator 17 is provided inside the turbine runner 13 and the pump impeller 16. The stator 17 is coupled to an outer race (not shown) of a one-way clutch 110. A hollow shaft 111 is coupled to an inner race of the one-way clutch 110. The input shaft 105 is disposed inside the hollow shaft 111. The hollow shaft 111 and the input shaft 105 can rotate relative to each other. The hollow shaft 111 is fixed on the side of the casing 101. A lock-up clutch 19 is provided so as to control a power-transmission state between the front cover 107 and the input shaft 105. The casing that is mainly formed of the pump impeller 16 and the front cover 107, constructed as described above, is supplied with oil, i.e., hydraulic fluid.

Due to the aforementioned construction, power (torque) in the engine 1 is transmitted from the crank shaft 2 to the front cover 107. If the lock-up clutch 19 is released at this moment, power in the pump impellor 16 is transmitted to the turbine runner 13 and then to the input shaft 105 with the aid of the kinetic energy of the oil. The torque transmitted from the pump impeller 16 to the turbine runner 13 can also be amplified by the stator 17. If the lock-up clutch 19 is engaged at an engaging pressure equal to or higher than a predetermined value, power transmitted to the front cover 107 is transmitted to the input shaft 105 with the aid of a frictional force applied to the lock-up clutch 19. If the lock-up clutch 19 slips or is in a slipping state due to a decrease in engaging pressure, power is transmitted between the front cover 107 and the input shaft 105 with the aid of both the frictional force applied to the lock-up clutch 19 and the kinetic energy of the oil.

The construction of the transmission 103 will now be described. An intermediate shaft 113 is disposed concentrically with the input shaft 105. The input shaft 105 and the intermediate shaft 113 are spline-fitted and coupled to each other so that they can rotate together. A hollow shaft 114 is fitted to the outer periphery of the intermediate shaft 113. The intermediate shaft 113 is disposed inside the hollow of the hollow shaft 114 so that the intermediate shaft 113 and the hollow shaft 114 can rotate relative to each other. A first planetary gear 115 is disposed outside the hollow shaft 114. The first planetary gear 115 has a sun gear 116 formed outside the hollow shaft 114, a ring gear 117 disposed outside the sun gear 116, and a carrier 119 for holding a pinion gear 118 engaging the sun gear 116 and the ring gear 117.

A hollow shaft 120 is disposed outside the intermediate shaft 113. In addition, another hollow shaft 121 is disposed outside the hollow shaft 120. The intermediate shaft 113, the hollow shaft 120, and the hollow shaft 121 can rotate relative to one another. A second planetary gear 122 is disposed outside the hollow shaft 121. The second planetary gear 122 has a sun gear 123 formed on the side of the outer periphery of the hollow shaft 121, a ring gear 124 disposed outside the sun gear 123, and a carrier 126 for holding a pinion gear 125 engaging the sun gear 123 and the ring gear 124. In addition, the carrier 126 is coupled to the hollow shaft 120. The carrier 126 and the hollow shaft 120 are coupled each other.

The connecting drum 127 couples the carrier 126 and the ring gear 117 to each other.

Frictional engagement elements constituting part of the transmission 103, such as clutches and brakes, will now be described. A first clutch (forward clutch) C1 for controlling a power-transmission state between the input shaft 105 on one hand and the hollow shaft 114 and the sun gear 116 on the other hand is provided. A second clutch (direct clutch) C2 for controlling a power-transmission state between the intermediate shaft 113 on one hand and the hollow shaft 120 and the carrier 126 on the other hand is provided. In addition, a third clutch (reverse clutch) C3 for controlling a power-transmission state between the intermediate shaft 113 on one hand and the hollow shaft 121 and the sun gear 123 on the other hand is provided. Furthermore, a first brake B1 for controlling rotation and stoppage of the sun gear 123 is disposed between the hollow shaft 121 and the casing 101.

In addition, a second brake B2 and a first one-way clutch F1 are disposed in series between the hollow shaft 121 and the casing 101. The first brake B1, the second brake B2, and the first one-way clutch F1 are disposed in parallel. The second brake B2 is designed to control rotation and stoppage of the outer race of the first one-way clutch F1. The first one-way clutch F1 is designed to prevent the sun gear 123 from rotating in a predetermined direction when the second brake B2 is engaged. Furthermore, a third brake B3 for controlling rotation and stoppage of the ring gear 117 and the connecting drum 127 are provided. Furthermore, a second one-way clutch F2 for preventing the ring gear 117 and the connecting drum 127 from rotating in a predetermined direction is disposed between the casing 101 and the connecting drum 127. The second one-way clutch F2 and the third brake B3 are disposed parallel to each other.

A cylindrical member 128 is coupled to the carrier 119. A counter drive gear 130 is fitted to the outer periphery of the cylindrical member 128. The counter shaft 131 is disposed parallel to the intermediate shaft 113. A counter driven gear 132 and a drive pinion gear 133 are fitted to the counter shaft 131.

The final reducer 10 has a hollow differential case 55. A bearing (not shown) rotatably holds the differential case 55. A ring gear 58 is disposed on the outer periphery of the differential case 55. The drive pinion gear 133 is in engagement with the ring gear 58. A pinion shaft 59 is disposed inside the differential case 55. Two pinion gears 60 are fitted to the pinion shaft 59. Two side gears 61 are in engagement with the pinion gears 60. The two side gears 61 are connected separately to front drive shafts 62. A wheel (front wheel) 63 is coupled to each of the front drive shafts 62.

Figure 3:
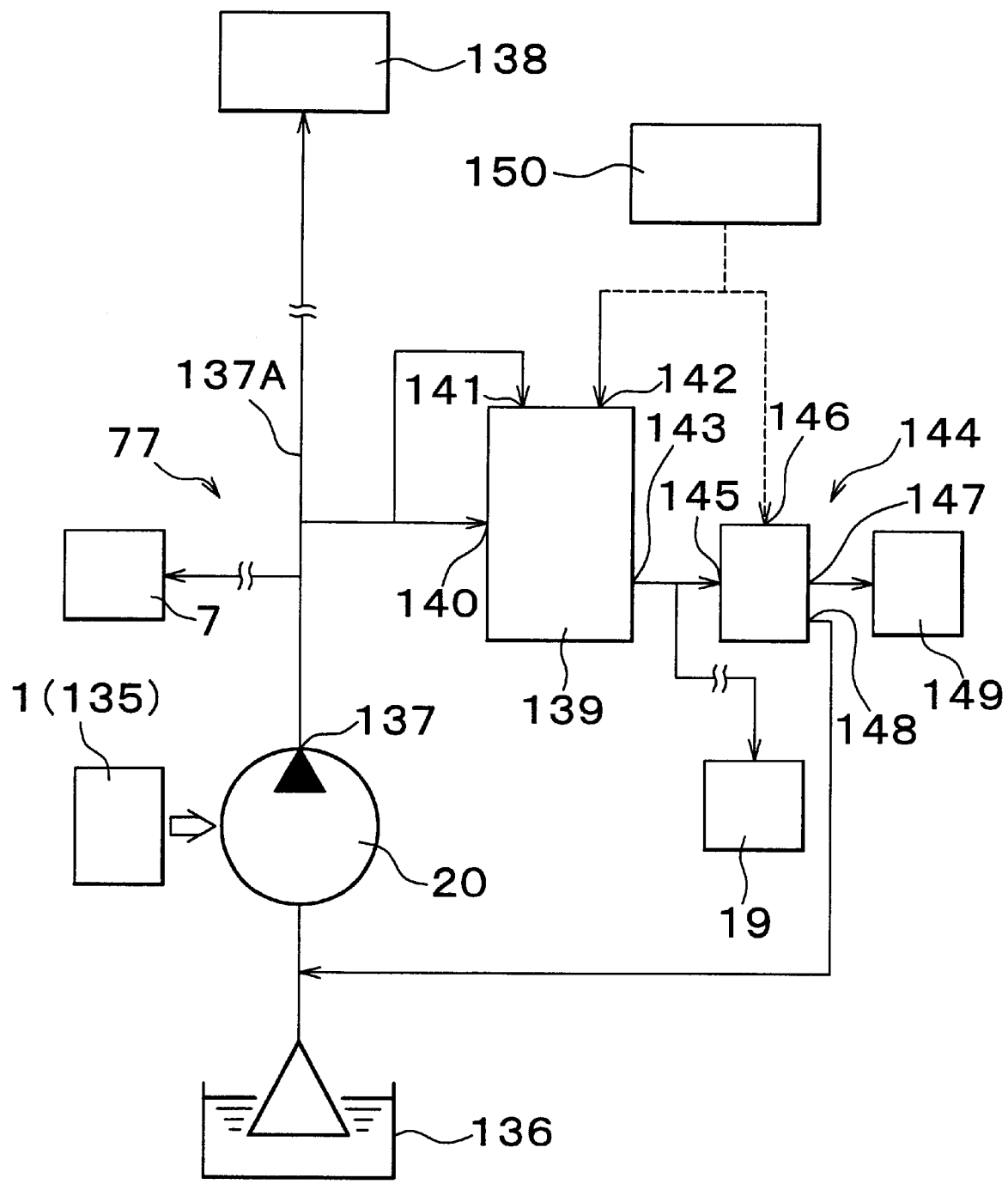
FIG. 3 is a conceptual view of a hydraulic control device installed in a temperature control device according to an embodiment of the invention.

FIG. 3 is a hydraulic circuit showing part of a hydraulic control device 77 for controlling the lock-up clutch 19 and the frictional engagement elements of the transmission 103. An oil pump 20 is driven so that oil pumped up from an oil pan 136 is discharged from a discharge port 137. Either the engine 1 or an electric motor 135 that is provided separately can be used as a power plant for driving the oil pump 20. In the power train shown in FIG. 2, if the engine 1 is used as a power plant, the pump impeller 16 and the oil pump 20 are coupled to each other so that power can be transmitted between them. If power in the engine 1 is transmitted to the pump impeller 16, the oil pump 20 is driven by the power. In the case where the electric motor 135 is used as a power plant, the electric motor 135 and the oil pump 20 are coupled to each other. The electric motor 135 can be used either as a power source for driving the vehicle or a power source for driving auxiliaries.

An oil passage 137A connected to the discharge port 137 is connected to a corresponding one of hydraulic chambers 138 for separately controlling engaging pressures of frictional engagement elements such as clutches and brakes shown in FIG. 2. The oil passage 137A is provided with a primary regulator valve 139 that is disposed parallel to the hydraulic chamber 138. The primary regulator valve 139 has an input port 140, a control port 141, a pressure-regulating port 142, and an escape port 143. A hydraulic pressure of oil discharged from the discharge port 137 is input to the input port 140 and the control port 141 through the oil passage 137A. A signal pressure of a linear solenoid valve 150 that is controlled on the basis of the opening of an accelerator or the like is input to the pressure-regulating port 142.

The secondary regulator valve 144 has an input port 145, a pressure-regulating port 146, an output port 147, and a drain port 148. The input port 145 is connected to the escape port 143. The output port 147 is connected to a lubricating system 149 that lubricates and cools the interior of the casing 101. The drain port 148 is connected to a suction side of the oil pump 20. In addition, a signal pressure of the linear solenoid valve 150 is input to the pressure-regulating port 146.

In the hydraulic control device 77, oil pumped by the oil pump 20 flows into the input port 140 of the primary regulator valve 139. A signal pressure input to the pressure-regulating port 142 controls the amount of oil flowing out from the escape port 143 of the primary regulator valve 139. Thereby, the hydraulic pressure applied to the oil passage 137A, namely, the line pressure is controlled. Due to operation of a shift solenoid valve (not shown), oil is selectively supplied to or discharged from a corresponding one of the hydraulic chambers 138. In this manner, the frictional engagement elements are engaged, released, or caused to slip.

Oil flowing out from the escape port 143 flows into the input port 145 of the secondary regulator valve 144. The amount of oil delivered from the output port 147 to the lubricating system 149 and the amount of oil discharged from the drain port 148 are controlled on the basis of a signal pressure input to the pressure-regulating port 146 of the secondary regulator valve 144. Oil supplied to the lubricating system 149 cools and lubricates subsystems constituting the transmission 103, such as gears, frictional engagement elements, bearings, and rotational members. Oil that has lubricated and cooled the subsystems returns to the oil pan 136. In addition, part of the oil that has circulated out from the escape port 143 is supplied to the side of the lock-up clutch 19. Furthermore, oil discharged from the discharge port 137 of the oil pump 20 is supplied to the side of the torque converter 7.

Figure 4:
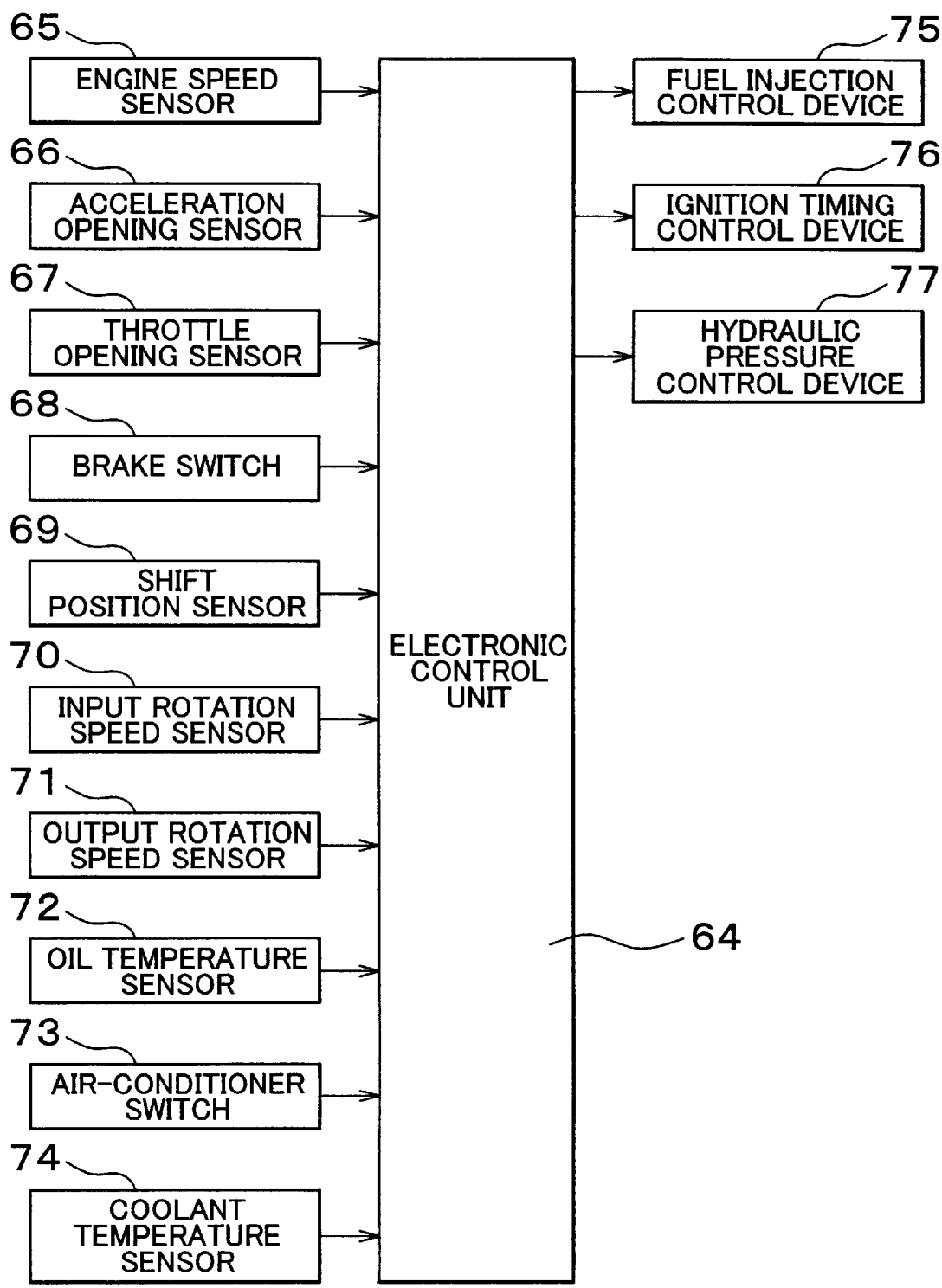
FIG. 4 is a block diagram of a vehicular control system of an embodiment to which the invention is applied.

FIG. 4 is a block diagram of the control system shown in FIGS. 2 and 3. An electronic control unit 64 for controlling the entire vehicle is constructed of a microcomputer, which is mainly composed of a processing unit (CPU or MPU), a storage unit (RAM or ROM), and an I/O interface.

A signal from an engine speed sensor 65, a signal from an accelerator opening sensor 66, a signal from a throttle opening sensor 67, a signal from a brake switch 68, a signal from a shift position sensor 69, a signal from an input rotation speed sensor 70 for detecting a rotation speed of the input shaft 105, a signal from an output rotation speed sensor 71 for detecting a rotation speed of the counter drive gear 130, a signal from an oil 15 temperature sensor 72 for detecting a temperature of hydraulic fluid, a signal from an air-conditioner switch 73, a signal from a coolant temperature sensor 74 for detecting a temperature of coolant in the engine 1, and the like are input to the electronic control unit 64.

A vehicle speed is calculated on the basis of a signal from the output rotation speed sensor 71.

A speed-change map and a lock-up clutch control map are stored in the electronic control unit 64. The speed-change map is designed to control speed-change stages of the transmission 103 on the basis of an opening of the accelerator and a vehicle speed. The lock-up clutch control map is designed to control the state of the lock-up clutch 19 on the basis of an opening of the accelerator and a vehicle speed.

The shift position sensor 69 is designed to detect a position of a shift lever that is operated by a driver. In the transmission 103 shown in FIG. 2, the shift position sensor 69 can detect, for example, a P (parking) position, a R (reverse) position, a N (neutral) position, a D (drive) position, a 2 (second) position, and an L (low) position. The P position and the N position are non-drive positions, which are designed to control the state of the transmission 103 such that power is not transmitted between the input shaft 105 and the counter drive gear 130. The R position, the D position, the 2 position, and the L position are drive positions, which are designed to control the state of the transmission 103 such that power can be transmitted between the input shaft 105 and the counter drive gear 130. The R position is designed to move the vehicle backwards. The D position, the 2 position, and the L position are designed to move the vehicle forwards.

The range in which the speed-change ratio of the transmission 103 is controlled differs among the drive positions. In FIG. 2, the speed-change ratio of the transmission 103 means the ratio of the rotation speed of the input shaft 105 to the rotation speed of the counter drive gear 130. FIG. 5 is a chart showing speed-change ratios or speed-change stages that can be set in each of the shift positions, and operational states of the frictional engagement elements in the case where the speed-change stages that can be selected in each of the respective shift positions are set.

In the D position, first to fourth speed-change stages can be selected. In the 2 position, the first or second speed-change stage can be selected. In the L position, only the first speed-change stage can be selected. In the R position, the speed-change ratio is constant.

In FIG. 5, the smaller the ordinal number preceding the word "SPEED" becomes, the greater the speed-change ratio of the transmission 103 becomes. In FIG. 5, each space marked with "O" means that a corresponding one of the frictional engagement elements is engaged, and each blank space means that a corresponding one of the frictional engagement elements is released. "Engaging a certain frictional engagement element" means controlling an engaging pressure of the frictional engagement element as soon as torque is transmitted thereto in such a manner as to prevent frictional members constituting the frictional engagement element from slipping with respect to each other.

The operation of the transmission 103 will be described with reference to FIG. 5. The first speed in the D or 2 position is set such that the sun gear 116 of the first planetary gear 115 rotates while the ring gear 117 of the first planetary gear 115 is prevented from rotating, if the first clutch C1 and the second one-way clutch F2 are engaged, that is, if a torque of the engine 1 is transmitted to the input shaft 105 via the torque converter 7. The ring gear 117 serves as a counterforce element, so that the carrier 119 of the first planetary gear 115 rotates in the same direction as the input shaft 105. That is, the carrier 119 rotates at lower speed than the rotation speed of the sun gear 116, and the torque of the sun gear 116 is transmitted to the counter drive gear 130. The torque transmitted to the counter drive gear 130 is transmitted to the ring gear 58 via the counter driven gear 132, the counter shaft 131, and the drive pinion gear 133. The torque transmitted to the ring gear 58 is transmitted to the front wheel 63 via the pinion gear 60, the side gear 61, and the front drive shaft 62.

The first speed in the 2 position is set such that the first clutch Cl, the third brake B3, and the second one-way clutch F2 are engaged. If the first speed in the 2 position is set, the sun gear 116 of the first planetary gear 115 rotates while the ring gear 117 of the first planetary gear 115 is prevented from rotating. Then, as described above, the carrier 119 rotates at lower speed than the rotation speed of the sun gear 116, and the torque of the sun gear 116 is transmitted to the counter drive gear 130.

The second speed in the D position is set such that the first clutch C1, the second brake B2, and the first one-way clutch F1 are engaged. That is, if the second speed in the D position is set, the sun gear 123 of the second planetary gear 122 is prevented from rotating in one direction. Thus, if a torque of the engine 1 is transmitted to the sun gear 116 so that the carrier 119 is urged to rotate, the sun gear 123 serves as a counterforce element.

As a result, the carrier 126 rotates in the same direction as the sun gear 116. Accordingly, the carrier 126 rotates at lower speed than the rotation speed of the sun gear 116, and the torque of the sun gear 116 is transmitted to the counter drive gear 130 via the carrier 119.

The second speed in the 2 position is set such that the first clutch C1, the first brake B1, the second brake B2, and the first one-way clutch F1 are engaged. That is, if the second speed in the 2 position is set, the sun gear 123 of the second planetary gear 122 is prevented from rotating normally and reversely. Thus, if a torque of the engine 1 is transmitted to the sun gear 116 so that the carrier 119 is urged to rotate, the sun gear 123 serves as a counterforce element. As a result, the carrier 126 rotates in the same direction as the sun gear 116. Accordingly, the carrier 119 rotates at lower speed than the rotation speed of the sun gear 116, and the torque of the sun gear 116 is transmitted to the counter drive shaft 130 via the carrier 119.

If the second speed in the 2 position is set while the vehicle is in a coasting state, power in the front wheel 63 is transmitted to the counter drive gear 130 via the final reducer 10. Because the sun gear 123 is prevented from rotating normally and reversely, then the carrier 126 rotates at lower speed than the rotation speed of the carrier 119, and power in the carrier 119 is transmitted to the ring gear 117 via the carrier 126. The power transmitted to the ring gear 117 is transmitted to the sun gear 116, and the sun gear 116 is rotated at a speed higher than the ring gear 117. The power thus transmitted to the sun gear 116 is transmitted to the engine 1 via the input shaft 105 and the torque converter 7, so that an engine-braking force is generated.

The third speed in the D position is set such that the first clutch C1, the second clutch C2, and the second brake B2 are engaged. That is, if the third speed in the D position is set, the first planetary gear 115 rotates integrally. Therefore, a torque of the sun gear 116 is transmitted to the counter drive gear 130 while the rotation speed of the sun gear 116 remains unchanged. That is, the power-transmission state between the input shaft 105 and the counter drive gear 130 is a so-called direct-coupled state at this moment. In the case where the third speed in the D position has been set, if power in the front wheel 63 is transmitted to the counter drive gear 130 via the final reducer 10 while the vehicle is in a coasting state, the first planetary gear 115 rotates integrally. As a result, power in the first planetary gear 115 is transmitted to the side of the engine 1, so that an engine-braking force is generated.

The fourth speed in the D position is set such that the second clutch C2, the first brake B1, and the second brake B2 are engaged. That is, the fourth speed in the D position is set, a torque of the input shaft 105 is transmitted to the carrier 126 via the intermediate shaft 113. The sun gear 123 then serves as a counterforce element, so that the carrier 126 rotates in the same direction as the input shaft 105. Also, the ring gear 124 rotates at higher speed than the rotation speed of the carrier 126, and a torque of the carrier 126 is transmitted to the counter drive gear 130 via the ring gear 124 and the carrier 119. That is, the rotation speed of the counter drive gear 130 becomes higher than the rotation speed of the input shaft 105. In other words, a so-called overdrive state is obtained.

Thus, in the case where the third speed in the D position is shifted to the fourth speed in the D position, the first clutch C1 that is engaged in the third speed is released while the first brake B1 that is released in the third speed is engaged. In the case where the fourth speed in the D position is shifted to the third speed in the D position, the first brake B1 that is engaged in the fourth speed is released, and the first clutch C1 that is released in the fourth speed is engaged. That is, a shifting operation between the third speed and the fourth speed is a clutch-to-clutch shifting operation that is designed to change the states of a plurality of frictional engagement elements simultaneously.

If the R position is selected, the third clutch C3 is engaged, and the third brake B3 is engaged. The input shaft 105 and the intermediate shaft 113 then rotate integrally, and a torque of the intermediate shaft 113 is transmitted to the sun gear 123. The carrier 126 then serves as a counterforce element. As a result, the ring gear 124 rotates at lower speed than the rotation speed of the sun gear 123, and a torque of the sun gear 123 is transmitted reversely to the ring gear 124. Thus, the counter drive gear 130 rotates reversely with respect to the rotational direction of the input shaft 105, so that a driving force for moving the vehicle backwards is generated. As described above, the transmission shown in FIG. 2 is a multiple-stage automatic transmission whose speed-change ratio is shifted gradationally and automatically.

It can be described as follows how the construction shown in FIGS. 2 and 3 corresponds to the construction of the invention. The pump impeller 16 can be regarded as one rotational member of the invention. The turbine runner 13 can be regarded as the other rotational member of the invention. The torque converter 7 can be regarded as the hydrodynamic power-transmission system of the invention. The torque converter 7 and the transmission 103 can be regarded as the power-transmission system of the invention. The component members such as the hydraulic control device 77, the transmission 103, and the torque converter 7 can be regarded as the subsystem of the invention. The linear solenoid valve 150 can be regarded as the actuator of the invention. The first clutch C1 and the first brake B1 can be regarded as the frictional engagement elements. The engine 1 can be regarded as the driving-power source of the invention. The electric motor 135 can be regarded as the power plant of the invention.

In a state where the lock-up clutch 19 of the torque converter 7 has been released, power is transmitted between the pump impeller 16 and the turbine runner 13 with the aid of the kinetic energy of hydraulic fluid. This hydraulic fluid possesses the property of increasing in viscosity in proportion to a fall in temperature. Thus, if the vehicle is stopped while the engine 1 is in operation, the shearing resistance between contact surfaces of the pump impeller 16 and hydraulic fluid increases. As a result, the power loss of the engine 1 may increase to the extent of adversely affecting fuel consumption.

A control example as a countermeasure against such a problem will be described with reference to the flowchart shown in FIG. 1. It is first determined, on the basis of a signal from the oil temperature sensor 72, whether or not the temperature of hydraulic fluid is equal to or lower than a predetermined temperature (step S1). If the result in step S1 is negative, the present control routine is terminated.

If the result in step S1 is positive, it is determined whether or not the vehicle is running in a decelerating manner, more specifically, whether or not the vehicle is coasting (step S2). If the result in step S2 is negative, the present control routine is terminated. If it is detected that a throttle valve in an intake pipe of the engine 1 is fully closed and that a brake pedal has been depressed, the result in step S2 is positive. A control operation is then performed to raise the temperature of hydraulic fluid (step S3), whereby the present control routine is terminated. Such a rise in temperature of hydraulic fluid leads to a decrease in viscosity of the hydraulic fluid as well as a decrease in shearing resistance. Therefore, the power loss of the engine 1 is reduced. This results in an improvement in fuel consumption.

Hereinafter, some control operations that can be performed in step S3 of FIG. 1 will be described. The first control operation is designed to increase a line pressure in the oil passage 137A of the hydraulic control device 77 by controlling the duty ratio of the linear solenoid valve 150. More specifically, the first control operation is designed to change a first target line pressure corresponding to an opening of the accelerator into a second target line pressure, which is higher than the first target line pressure.

The first target line pressure is set in such a manner as to maintain an engaging pressure of the frictional engagement elements at a predetermined pressure so as to transmit a torque of the input shaft 105 to the counter drive gear 130. The torque transmitted from the input shaft 105 to the counter drive gear 130 is calculated on the basis of an engine output, a speed ratio of the torque converter 7, a selected shift position, a speed-change stage set in the transmission 103, and the like.

If the first control operation is performed, that is, if the pressure-regulating port 142 is controlled by the linear solenoid valve 150 in such a manner as to control the amount of oil flowing out from the escape port 143, the amount of oil flowing out from the escape port 143 of the primary regulator valve 139 becomes smaller than an amount oil flowing out from the escape port 143 corresponding to the first target line pressure. As a result, the rise in line pressure is increased. Therefore, when oil pumped by the oil pump flows through the oil passage 137A, the pipe-line resistance of the oil passage 137A increases. That is, the pipe-line resistance changes in accordance with the amount of work done by the oil pump 20, namely, the product of discharge pressure and flow rate. The frictional force between hydraulic fluid and a wall surface forming the oil passage 137A changes. As a result, the amount of heat generated between hydraulic fluid and the wall surface changes.

The amount of oil flowing out from the escape port 143 of the primary regulator valve 139 decreases as described above. Thereby heat is accumulated in the oil passage 137A, and the temperature of hydraulic fluid is raised. The hydraulic fluid whose temperature has thus been raised is returned to the oil pan 136 via the secondary regulator valve 144. This hydraulic fluid is delivered to the interior of the torque converter 7. Accordingly, if the line pressure is increased from the first target line pressure to the second target line pressure through the first control operation, the power loss of the engine 1 is reduced in the case where the vehicle is stopped while the engine 1 is in operation.

Figure 6:
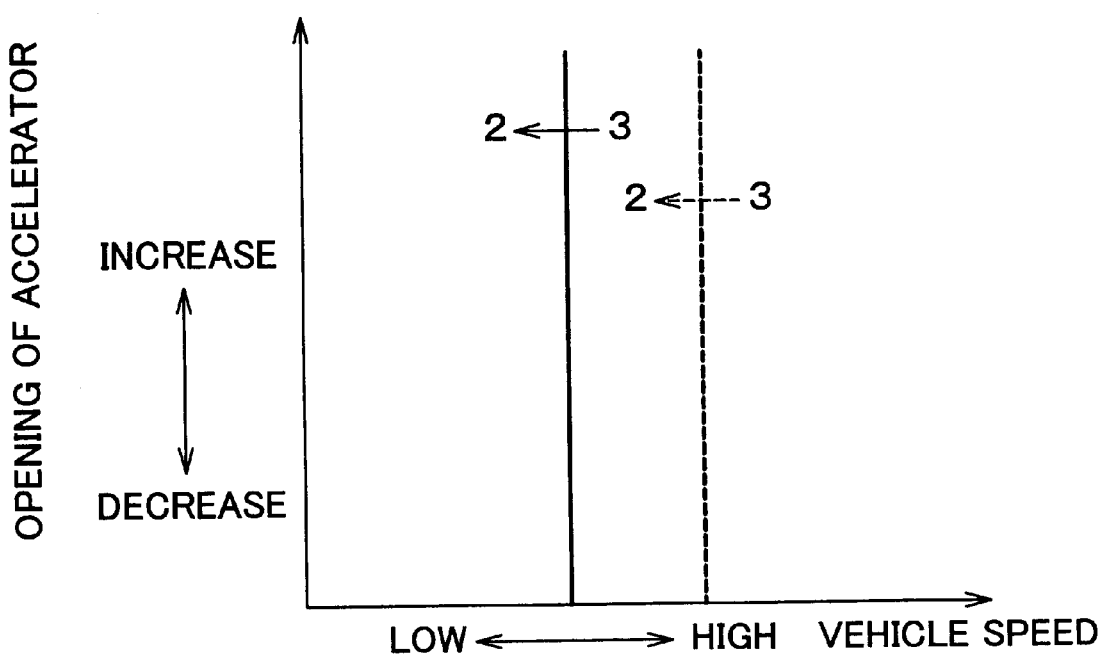
FIG. 6 is a speed-change map that is used in the control example shown in FIG. 1.

The second control operation that can be performed in step S3 will now be described. The second control operation is designed to differentiate between speed-change control of the transmission 103 before proceeding to step S3 and speed-change control of the transmission 103 after proceeding to step S3. FIG. 6 shows one example of maps used for speed-change control of the transmission 103. The map in FIG. 6 shows reference downshift lines for determining whether or not a downshift operation from a certain speed-change stage to another speed-change stage is to be performed. In this map, the opening of the accelerator and the vehicle speed are used as parameters.

The map in FIG. 6 shows downshift lines for performing a downshift operation from the third speed to the second speed. In FIG. 6, the downshift line used before proceeding to step S3 is indicated by a solid line, whereas the downshift line used in step S3 is indicated by a broken line. That is, the downshift line indicated by the broken line and the downshift line indicated by the solid line are set such that the former corresponds to a higher vehicle speed than the latter. There are two methods of shifting from the downshift line indicated by the solid line to the downshift line indicated by the broken line. One of them is designed to separately set the downshift lines in advance and selectively read the downshift lines. The other is designed to set only one of the downshift lines and correct it so as to obtain the other downshift line. The operation of controlling the downshift lines in step S3 is not limited to the downshift operation from the third speed to the second speed. It is also possible to perform a downshift operation between any other two speed-change stages.

Accordingly, when the vehicle is running at a high speed, the downshift operation from the third speed to the second speed before proceeding to step S3 is more likely to be performed than the downshift operation from the third speed to the second speed after proceeding to step S3. As a result, the rotation speed of the input shaft 105 after proceeding to step S3 is higher than the rotation speed of the input shaft 105 before proceeding to step S3. In other words, the difference between the rotation speed of the pump impeller 16 and the rotation speed of the turbine runner 13 after proceeding to step S3 is greater than the difference between the rotation speed of the pump impeller 16 and the rotation speed of the turbine runner 13 before proceeding to step S3. Therefore, the amount of frictional heat generated through the shearing resistance between hydraulic fluid and the turbine runner 13 by unit time after proceeding to step S3 is greater than the amount of frictional heat generated through the shearing resistance between hydraulic fluid and the turbine runner 13 before proceeding to step S3. As a result, the viscosity of hydraulic fluid is reduced. Thus, an improvement in fuel consumption is achieved in the case where the vehicle is stopped while the engine 1 is in operation.

The third control operation that can be performed in step S3 will now be described. The third control operation is designed to set a speed-change stage for generating an engine-braking force as the speed-change stage of the transmission 103 after proceeding to step S3 if a speed-change stage in which no engine-braking force is generated is set as the speed-change stage of the transmission 103 before proceeding to step S3. For example, before proceeding to step S3, speed-change control of the transmission 103 is performed on the basis of the speed-change map that is stored in advance. On the other hand, after proceeding to step S3, it is appropriate that the speed-change stage of the transmission 103 be set as the third speed in the D position or the second speed in the 2 position. If the rotation speed of the input shaft 105 is increased by thus performing the third control operation, an improvement in fuel consumption is achieved for the same reason as in the case of the second control operation.

The fourth control operation that can be performed in step S3 will be described. The fourth control operation can be applied to a system in which the oil pump 20 and the pump impeller 16 are coupled to each other. The fourth control operation is designed to increase the engaging pressure of the lock-up clutch 19. That is, if the lock-up clutch 19 is released on the basis of the lock-up clutch control map before proceeding to step S3, it is controlled and caused to slip or engaged completely. Then, in the case where power in the front wheel 63 is transmitted to the oil pump 20 via the input shaft 105 and the pump impeller 16, the loss in the efficiency of power transmission in the lock-up clutch 19 is reduced. Thus, the discharge pressure and the discharge flow rate of the oil pump 20 are increased.

As a result, the amount of work actually done by the oil pump 20 is greater than a target amount of work to be done by the oil pump 20. The temperature of hydraulic fluid in the oil passage 137A rises in accordance with the amount of work corresponding to a difference between the target amount of work and the actual amount of work. As in the case of the first control operation, the temperature of hydraulic fluid rises because the pipe-line resistance of oil flowing through the hydraulic circuit is increased. Accordingly, in the case where the lock-up clutch 19 is again released or caused to slip with using the lock-up clutch control map after performing the fourth control operation while the vehicle is running with the aid of power in the engine 1, an improvement in fuel consumption is achieved.

The fifth control operation that can be performed in step S3 will be described. The fifth control operation is performed in the case where the D position is selected and where the third speed or the fourth speed is set as the speed-change ratio of the transmission 103. More specifically, the hydraulic pressure in a certain one of the hydraulic chambers 138 corresponding to the first clutch C1 and the first brake B1 is controlled such that the first clutch C1 and the first brake B1 slip if torque is transmitted to the transmission 103. In the case where the fifth control operation is thus performed, power in the front wheel 63 is transmitted to the hollow shaft 121 so that the frictional members constituting the first brake B1 slip with respect to each other, and power in the front wheel 63 is transmitted to the hollow shaft 114 so that the frictional members constituting the first clutch C1 slip with respect to each other. As a result, the frictional heat generated by these frictional members is transmitted to oil that lubricates and cools the interior of the casing 101. As the temperature of the oil rises, the viscosity thereof is reduced. Accordingly, an improvement in fuel consumption can also be achieved by performing the fifth control operation.

Figure 1:
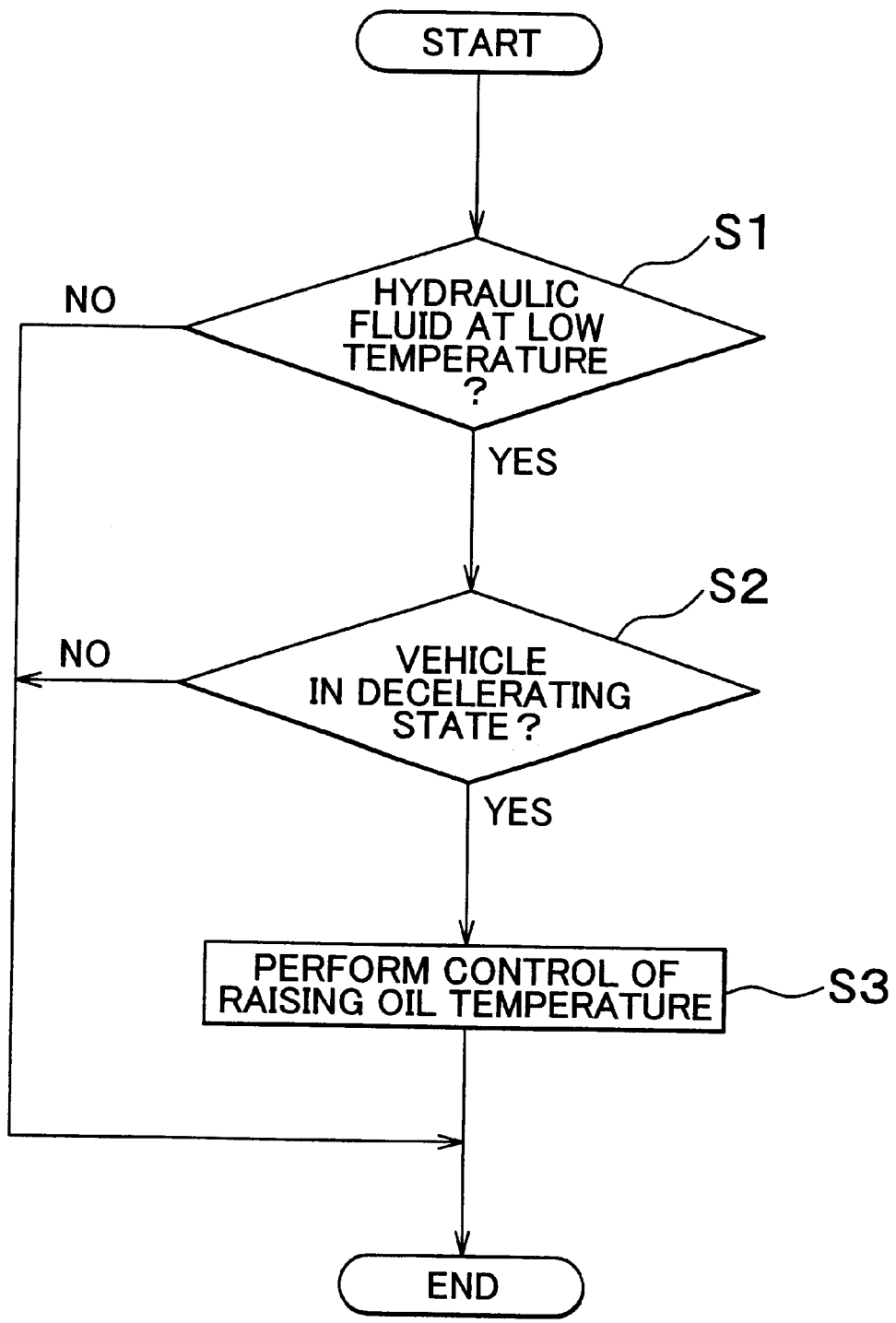
FIG. 1 is a flowchart showing one control example of a temperature control device according to the invention.
Figure 7:
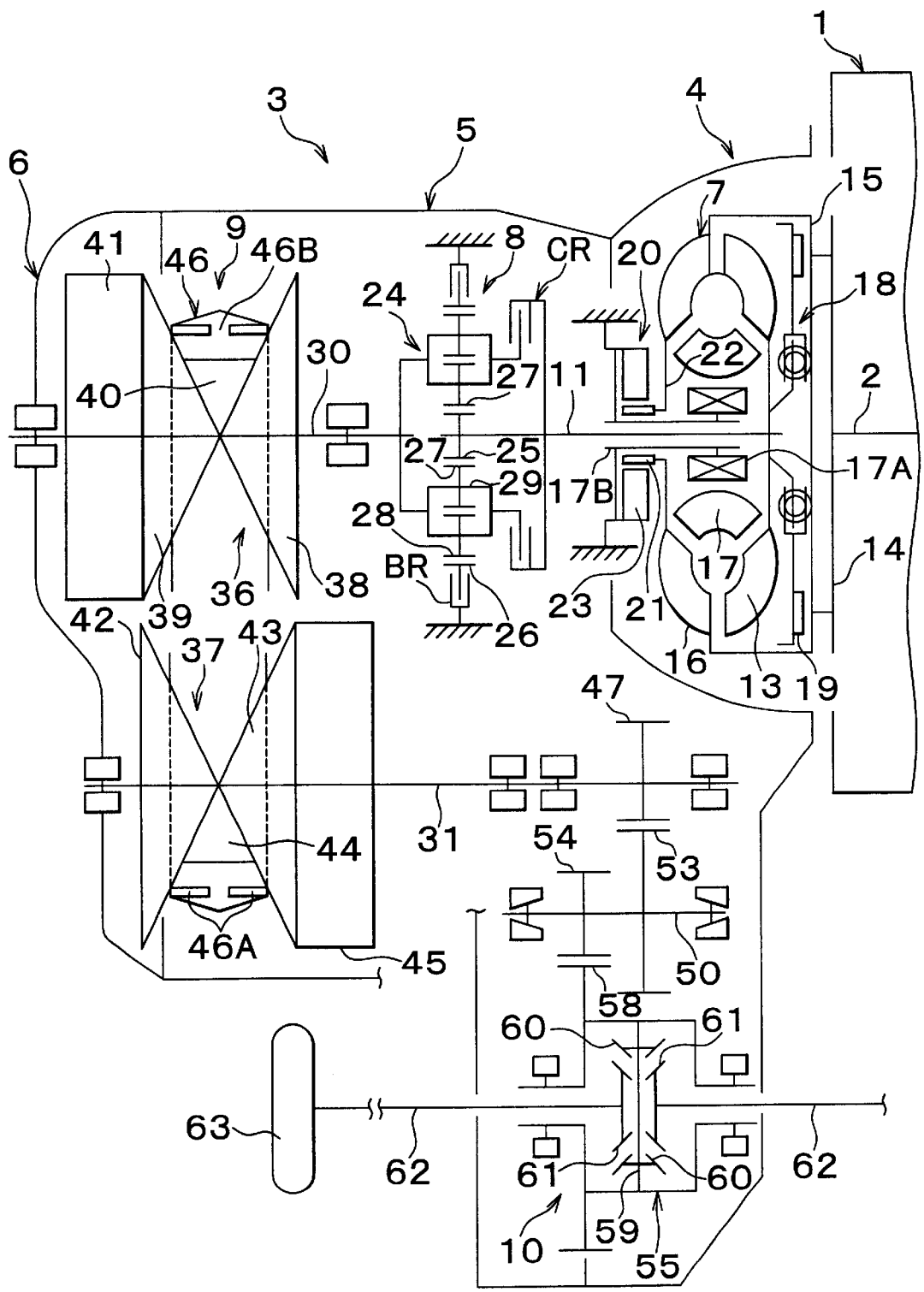
FIG. 7 is a schematic diagram of another power train that is designed to be controlled according to the control example shown in FIG. 1.

FIG. 7 is a schematic diagram of another power train to which the control example shown in FIG. 1 can be applied. In FIG. 7, subsystems identical to those shown in FIG. 2 are denoted by the same reference numerals and will not be described below. A transaxle 3 is disposed on the output side of the engine 1. The transaxle 3 is a unit including an integral-type casing 5 into which the torque converter 7, a forward-backward movement switching mechanism 8, a belt-type continuously variable transmission 9, and the final reducer 10 are integrated.

The construction of the torque converter 7 will now be described. An input shaft 11 that can rotate coaxially with the crank shaft 2 is provided. The turbine runner 13 is fitted to an end of the input shaft 11 on the side of the engine 1.

The front cover 15 is coupled to the rear end of the crank shaft 2 via a drive plate 14, and the pump impeller 16 is connected to the front cover 15. The turbine runner 13 and the pump impeller 16 are disposed facing each other. The stator 17 is disposed inside the turbine runner 13 and the pump impeller 16. The stator 17 is connected to a hollow shaft 17B via a one-way clutch 17A. The input shaft 11 is disposed inside the hollow shaft 17B. The hollow shaft 17B and the input shaft 11 can rotate relative to each other. The lock-up clutch 19 is provided via a damper mechanism 18 at an end of the input shaft 11 on the side of the front cover 15. The casing that is mainly formed of the pump impeller 16 and the front cover 15 constructed as described above is supplied with oil, i.e., hydraulic fluid.

Due to the aforementioned construction, power (torque) in the engine 1 is transmitted from the crank shaft 2 to the front cover 15. If the lock-up clutch 19 is released at this moment, power in the pump impellor 16 is transmitted to the turbine runner 13 and then to the input shaft 11 with the aid of the kinetic energy of oil. The torque transmitted from the pump impeller 16 to the turbine runner 13 can also be amplified by the stator 17. On the other hand, if the lock-up clutch 19 is engaged, a torque of the front cover 15 is transmitted to the input shaft 11 with the aid of a frictional force applied to the lock-up clutch 19.

The oil pump 20 is disposed between the torque converter 7 and the forward-backward movement switching mechanism 8. The oil pump 20 is provided with a body 23 and a rotor 21. A cylindrical hub 22 is securely welded to an inner peripheral end of the pump impeller 16. Part of the hollow shaft 17B protrudes into the oil pump 20. The hollow shaft 17B is fixed to the body 23. The body 23 is fixed to the casing 5. The aforementioned construction makes it possible to transmit power in the engine 1 to the rotor 21 via the pump impeller 16 and drive the oil pump 20. If the oil pump 20 is driven, oil stored in the oil pan 136 is pumped.

The forward-backward movement switching mechanism 8 is disposed in a power-transmission path between the input shaft 11 and the belt-type continuously variable transmission 9. The forward-backward movement switching mechanism 8 has a planetary gear mechanism 24 of a double-pinion type. The planetary gear mechanism 24 has a sun gear 25 disposed at an end of the input shaft 11 on the side of the belt-type continuously variable transmission 9, a ring gear 26 disposed concentrically with the sun gear 25, a pinion gear 27 meshing with the sun gear 25, a pinion gear 28 meshing with the pinion gear 27 and the ring gear 26, and a carrier 29 that holds the pinion gears 27, 28 such that they can rotate and revolve integrally around the sun gear 25. The carrier 29 is coupled to a primary shaft (to be described later) of the belt-type continuously variable transmission 9.

A forward clutch CR for connecting and disconnecting a power-transmission path between the carrier 29 and the input shaft 11 is provided. The forward clutch CR can rotate upon the input shaft 11 and has a known structure in which annular plates and discs are arranged alternately in the axial direction. In addition, a reverse brake BR for controlling rotation and fixation of the ring gear 26 is disposed on the side of the transaxle case 5. The reverse brake BR is disposed on the outer peripheral side of the input shaft 11 and has a known structure in which annular plates and discs are arranged alternately in the axial direction.

The belt-type continuously variable transmission 9 has a primary shaft 30 disposed concentrically with the input shaft 11 and a secondary shaft 31 disposed parallel to the primary shaft 30. The primary shaft 30 is provided with a primary pulley 36, whereas the secondary shaft 31 is provided with a secondary pulley 37. The primary pulley 36 has a stationary sheave 38 that is formed integrally on the outer periphery of the primary shaft 30 and a movable sheave 39 that can move in the axial direction of the primary shaft 30. A V-shaped groove 40 is formed between opposed faces of the stationary sheave 38 and the movable sheave 39. A hydraulic actuator (i.e., a hydraulic servo mechanism) 41 for moving the movable sheave 39 and the stationary sheave 38 toward and away from each other by displacing the movable sheave 39 in the axial direction of the primary shaft 30 is provided.

The secondary pulley 37 has a stationary sheave 42 that is formed integrally on the outer periphery of the secondary shaft 31 and a movable sheave 43 that is designed to move in the axial direction of the secondary shaft 31. A V-shaped groove 44 is formed between opposed faces of the stationary sheave 42 and the movable sheave 43. A hydraulic actuator (i.e., a hydraulic servo mechanism) 45 for moving the movable sheave 43 and the stationary sheave 42 toward and away from each other by displacing the movable sheave 43 in the axial direction of the secondary shaft 31 is provided.

A belt 46 is extended around the groove 40 of the primary pulley 36 constructed as described above and the groove 44 of the secondary pulley 37 constructed as described above. The belt 46 has two hoops 46A that are designed as tensile members and a multitude of blocks 46B that are attached to the hoops 46A and that are arranged in the circumferential direction of the hoops 46A. A cylindrical counter driven gear 47 is fixed to the secondary shaft 31 on the side of the engine 1.

An intermediate shaft 50 parallel to the secondary shaft 31 is disposed in a power-transmission path between the final reducer 10 and the counter drive gear 47 of the belt-type continuously variable transmission 9. A counter driven gear 53 and a final drive gear 54 are formed on the intermediate shaft 50. The counter drive gear 47 is in mesh with the counter driven gear 53. The final drive gear 54 is in mesh with the ring gear 58 of the final reducer 10.

The hydraulic circuit shown in FIG. 3 can also be employed in the power train shown in FIG. 7. The hydraulic actuators 41, 45 shown in FIG. 7 have the hydraulic chambers 138 shown in FIG. 3. The control circuit shown in FIG. 4 can also be employed in the power train shown in FIG. 7. That is, the input rotation speed sensor 70 shown in FIG. 4 detects a rotation speed of the primary shaft 30, and the output rotation speed sensor 71 shown in FIG. 4 detects a rotation speed of the secondary shaft 31. In the power train shown in FIG. 7, the shift position sensor 69 shown in FIG. 4 can detect the P position, the R position, the N position, the D position, and the like. In addition, data for performing speed-change control of the belt-type continuously variable transmission 9 are stored in the electronic control unit 64. For instance, data for selecting an optimal operational state of the engine 1 by controlling the speed-change ratio of the belt-type continuously variable transmission 9 on the basis of a running state such as an opening of the accelerator or a vehicle speed are stored in the electronic control unit 64.

It will now be described how the construction shown in FIG. 7 corresponds to the construction of the invention. The belt-type continuously variable transmission 9 can be regarded as the transmission of the invention. The primary shaft 30 and the primary pulley 36 can be regarded as the input rotational members of the invention. The secondary shaft 31 and the secondary pulley 37 can be regarded as the output rotational members of invention. The other constitutional details shown in FIGS. 7 and 3 correspond to the invention in the same manner as the other constitutional details shown in FIGS. 2 and 3 correspond to the invention.

The control example of the power train shown in FIG. 7 will now be described where power in the engine 1 is transmitted to the front wheel 63. If the shift position sensor 69 detects the D position, the forward clutch CR and the reverse brake BR are engaged and released respectively, so that the input shaft 11 and the primary shaft 30 are directly coupled to each other. In this state, if a torque of the engine 1 is transmitted to the input shaft 11 via the torque converter 7, the input shaft 11, a carrier 29, and the primary shaft 30 rotate integrally. A torque of the primary shaft 30 is transmitted to the secondary shaft 31 via the primary pulley 36, the belt 46, and the secondary pulley 37. The torque transmitted to the secondary shaft 31 is transmitted to the intermediate shaft 50 via the counter drive gear 47 and the counter driven gear 53. The torque transmitted to the intermediate shaft 50 is transmitted to the final reducer 10 via the final drive gear 54.

If the R position is selected, the forward clutch CR and the reverse brake BR are released and engaged respectively, so that a ring gear 26 is fixed. Then, as the input shaft 11 rotates, the pinion gears 27, 28 revolve while rotating. A carrier 29 rotates reversely with respect to the input shaft 11. As a result, rotational members such as the primary shaft 30, the secondary shaft 31, the intermediate shaft 50, and the like rotate reversely with respect to the case of the D position.

The speed-change ratio of the belt-type continuously variable transmission 9 is controlled such that the engine 1 assumes an optimal operational state, on the basis of a request for acceleration of the vehicle (i.e., a request for a driving force) which can be determined from conditions such as a vehicle speed and an opening of the accelerator, the data stored in the electronic control unit 64 (e.g., an optimal fuel-consumption curve represented by parameters such as engine speed and throttle opening), and the like. More specifically, hydraulic pressures in the hydraulic chambers 138 of the hydraulic actuator 41 are controlled, whereby the width of the groove 40 of the primary pulley 36 is adjusted. As a result, the hanging diameter of the belt 46 extending around the primary pulley 36 changes, so that the ratio of input rotation speed to output rotation speed in the belt-type continuously variable transmission 9, namely, the speed-change ratio is controlled in a stepless manner (continuously).

In addition, hydraulic pressures in the hydraulic chambers 138 of the hydraulic actuator 45 are controlled, whereby the width of the groove 44 of the secondary pulley 37 changes. That is, the axial clamping force (sandwiching force) of the secondary pulley 37 applied to the belt 46 is controlled. This clamping force controls the tensile force applied to the belt 46 and the contact surface pressure between the primary pulley 36 or the secondary pulley 37 and the belt 46. Hydraulic pressures in the hydraulic chambers 138 of the hydraulic actuator 45 are controlled on the basis of a torque input to the belt-type continuously variable transmission 9, a speed-change ratio of the belt-type continuously variable transmission 9, and the like. The torque input to the belt-type continuously variable transmission 9 is determined on the basis of an engine speed, a throttle opening, a torque ratio of the torque converter 7, or the like.

If the vehicle is coasting, power in the front wheel 63 is transmitted to the secondary shaft 31 via the final reducer 10 and the intermediate shaft 50. The power transmitted to the secondary shaft 31 is transmitted to the primary shaft 30 via the secondary pulley 37 and the belt 46. The power transmitted to the primary shaft 30 is transmitted to the input shaft 11 via the forward-backward movement switching mechanism 8.

It will now be described how the belt 46 of the belt-type continuously variable transmission 9 transmits power in the case where power in the engine 1 is transmitted to the front wheel 63. In this case, if power in the primary shaft 30 is transmitted to the primary pulley 36, a pressing force is applied from the primary pulley 36 to each of the blocks 46B such that the block 46B is pressed toward the secondary pulley 37 and in the circumferential direction of the belt 46, due to a frictional force applied to contact surfaces between the primary pulley 36 and the block 46B. This pressing force is transmitted to the side of the secondary pulley 37 via each of the blocks 46B. The pressing force is transmitted to the secondary pulley 37 due to a frictional force applied to contact surfaces between each of the blocks 46B and the secondary pulley 37. As a result, the secondary pulley 37 rotates.

A description will now be made in the case where power in the front wheel 63 is transmitted to the input shaft 11. In this case, if power in the secondary shaft 31 is transmitted to the secondary pulley 37, a pressing force is applied from the secondary pulley 37 to each of the blocks 46B such that the block 46B is pressed toward the primary pulley 36 and in the circumferential direction of the belt 46, due to a frictional force between the secondary pulley 37 and the block 46B. This pressing force is transmitted to the side of the primary pulley 36 via each of the blocks 46B. The pressing force is transmitted to the primary pulley 36 due to a frictional force applied to contact surfaces between each of the blocks 46B and the primary pulley 36. Thus, the belt-type continuously variable transmission 9 is designed such that power is transmitted between the primary pulley 36 and the secondary pulley 37 due to a pressing force, i.e., a compressive force applied to each of the blocks 46B.

On the other hand, the belt 46 moves along a circular locus in its region extending around the primary pulley 36 and the secondary pulley 37. In this case, the blocks 46B rotate relative to each other upon some parts of their contacting portions, namely, upon locking edges (not shown).

An example in which the control example shown in FIG. 1 is applied to the power train shown in FIG. 7 will now be described. The aforementioned first control operation can be performed after proceeding to step S3. The operation and effect that can be achieved in the case where the first control operation is performed in the power train shown in FIG. 7 and the hydraulic control device 77 shown in FIG. 3 are identical to the operation and effect that can be achieved in the case where the first control operation is performed in the system shown in FIGS. 2 and 3. The second control operation can also be performed in the power train shown in FIG. 7.

That is, a downshift vehicle speed as a reference for increasing the ratio between rotation speeds of the primary shaft 30 and the secondary shaft 31, namely, the speed-change ratio exists in the speed-change map used in the belt-type continuously variable transmission 9. The second control operation is designed to make a change such that the downshift vehicle speed after proceeding to step S3 becomes higher than the downshift vehicle speed before proceeding to step S3. Even in the case where the second control operation is performed in the power train shown in FIG. 7, the rotation speed of the input shaft 11 after proceeding to step S3 becomes higher than the rotation speed of the input shaft 11 before proceeding to step S3. Therefore, the temperature of oil is raised in the same manner as in the case of the power train shown in FIG. 2. As a result, an improvement in fuel consumption can be achieved.

In the power train shown in FIG. 7, it is possible that the third control operation is performed. That is, a speed-change ratio for generating an engine-braking force is set as the speed-change ratio of the belt-type continuously variable transmission 9 after proceeding to step S3 if a speed-change ratio in which no engine-braking force is generated is set as the speed-change ratio of the belt-type continuously variable transmission 9 before proceeding to step S3. If the rotation speed of the input shaft 11 is increased by thus performing the third control operation, an improvement in fuel consumption is achieved for the same reason as in the case of the third control operation in the power train shown in FIG. 2.

The fourth control operation can also be performed in the power train shown in FIG. 7. That is, if power in the front wheel 63 is transmitted to the turbine runner 13 via the final reducer 10, the belt-type continuously variable transmission 9, and the input shaft 11 while the vehicle is coasting, an improvement in fuel consumption can be achieved by increasing an engaging pressure of the lock-up clutch 19, for the same reason as in the case where the fourth control operation is performed in the power train shown in FIG. 2.

In addition, the sixth control operation can be performed in the power train shown in FIG. 7. The sixth control operation is designed to set hydraulic pressures in the hydraulic chambers 138 of the hydraulic actuator 45 equal to a second target hydraulic pressure, which is higher than a first target hydraulic pressure. The first target hydraulic pressure is set in the case where the processing in step S3 is not performed. That is, the sandwiching force applied to the belt 46 from the secondary pulley 37 in the case where the processing in step S3 is performed is higher than the sandwiching force applied to the belt 46 from the secondary pulley 37 in the case where the processing in step S3 is not performed. Similarly, the tensile force applied to the belt 46 in the case where the processing in step S3 is performed is higher than the tensile force applied to the belt 46 in the case where the processing in step S3 is not performed.

As described above, the blocks 46B rotate relative to each other upon the locking edges in the region where the belt 46 moves along a circular locus. During rotation of the blocks 46B, the contacting portions between the inner peripheral face of each of the hoops 46A and a corresponding one of the blocks 46B slide with respect to each other. In the case where the sixth control operation is performed, the amount of frictional heat in the contacting portions between each of the hoops 46A and a corresponding one of the blocks 46B is increased in comparison with the case where the sixth control operation is not performed. The hydraulic fluid delivered to the lubricating system 149 lubricates and cools the belt 46. Therefore, if the hydraulic fluid comes into contact with the belt 46, heat in the belt 46 is transmitted to the hydraulic fluid. As a result, the temperature of the hydraulic fluid rises. Thus, an improvement in fuel consumption can also be achieved in the case where the sixth control operation is performed, for the same reason as in the case of the first control operation. Although the power train shown in FIG. 7 is designed such that the oil pump 20 is driven by power in the engine 1, it can also be designed such that the oil pump 20 is driven by the electric motor 135.

Figure 8:
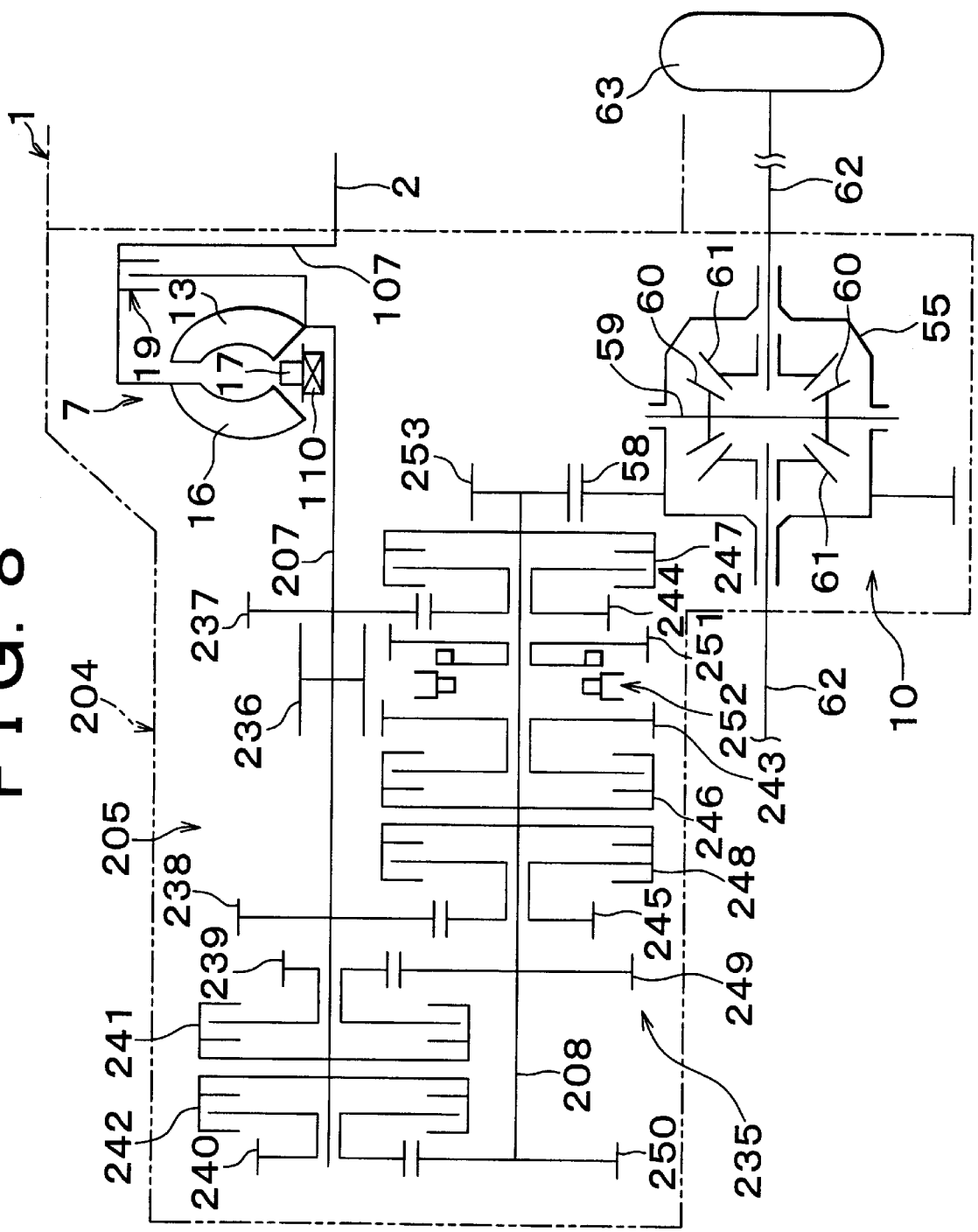
FIG. 8 is a schematic diagram of another power train that is designed to be controlled according to the control example shown in FIG. 1.

FIG. 8 is a schematic diagram of another power train that can be employed in the control example shown in FIG. 1. In FIG. 8, subsystems identical to those shown in FIG. 2 are denoted by the same reference numerals and will not be described below. A transaxle 204 is disposed on the output side of the engine 1. A transmission 205 and the final reducer 10 are integrated into the transaxle 204. The transmission 205 is provided with an input shaft 207 and a counter shaft 208 that are disposed parallel to each other.

The torque converter 7 is disposed between the engine 1 and the input shaft 207. A multiple-stage gearshift mechanism 235 disposed in the transmission 205 will now be described. A first-speed drive gear 236, a fourth-speed drive gear 237, and a fifth-speed drive gear 238 are fitted to the outer periphery of the input shaft 207.

A second-speed drive gear 239 and a third-speed drive gear 240 are rotatably fitted to the outer periphery of the input shaft 207. In addition, a second-speed clutch 241 for connecting and disconnecting the input shaft 207 and the second drive gear 239 and a third-speed clutch 242 for connecting and disconnecting the input shaft 207 and the third-speed drive gear 240 are disposed on the outer periphery of the input shaft 207.

A first-speed driven gear 243, a fourth-speed driven gear 244, and a fifth-speed driven gear 245 are rotatably fitted to the outer periphery of the counter shaft 208. The first-speed driven gear 243, the fourth-speed driven gear 244, and the fifth-speed driven gear 245 are in mesh with the first-speed drive gear 236, the fourth-speed drive gear 237, and the fifth-speed drive gear 238, respectively.

A first-speed clutch 246 for connecting and disconnecting the counter shaft 208 and the first-speed driven gear 243, a fourth-speed clutch 247 for connecting and disconnecting the counter shaft 208 and the fourth-speed driven gear 244, and a fifth-speed clutch 248 for connecting and disconnecting the counter shaft 208 and the fifth-speed driven gear 245 are disposed on the outer periphery of the counter shaft 208.

A second-speed driven gear 249 and a third-speed driven gear 250 are fitted to the outer periphery of the counter shaft 208. The second-speed driven gear 249 and the third-speed driven gear 250 are in mesh with the second-speed drive gear 239 and the third-speed drive gear 240, respectively.

In addition, a reverse driven gear 251 is rotatably fitted to the outer periphery of the counter shaft 208. Due to operation of a sleeve 252, the counter shaft 208 and the reverse driven gear 251 are engaged with each other and released from each other. The first-speed drive gear 236 and the reverse drive gear 251 are linked with each other by a reverse idle gear (not shown). A drive gear 253 is formed at an end of the counter shaft 208. The drive gear 253 is in mesh with the ring gear 58 of the final reducer 10.

The hydraulic control device 77 shown in FIG. 3 can be employed in the power train shown in FIG. 8. That is, the hydraulic chambers 138 are provided to control operations of the first-speed clutch 246, the second-speed clutch 241, the third-speed clutch 242, the fourth-speed clutch 247, the fifth-speed clutch 248, and the sleeve 252, respectively. The control system shown in FIG. 4 can be applied to the power train shown in FIG. 8. That is, the input rotation speed sensor 70 detects a rotation speed of the input shaft 207, and the output rotation speed sensor 71 detects a rotation speed of the counter shaft 208. The transmission 205 is designed to make a selection among forward stages or a backward stage by means of a shift lever. The forward stages are first to fifth speed-change stages that can be switched selectively. The shift position sensor 69 detects a manual operation of the shift lever.

The operation of the power train shown in FIG. 8 will be described in the case where power in the engine 1 is transmitted to the front wheel 63. If the shift position sensor 69 detects the first speed, the first-speed clutch 246 is engaged. A torque of the input shaft 207 is then transmitted to the counter shaft 208 via the first-speed drive gear 236 and the first-speed driven gear 243. If the shift position sensor 69 detects the second speed, the second-speed clutch 241 is engaged. A torque of the input shaft 207 is then transmitted to the counter shaft 208 via the second-speed drive gear 239 and the second-speed driven gear 249.

In addition, if the shift position sensor 69 detects the third speed, the third-speed clutch 242 is engaged. A torque of the input shaft 207 is then transmitted to the counter shaft 208 via the third-speed drive gear 240 and the third-speed driven gear 250. If the shift position sensor 69 detects the fourth speed, the fourth-speed clutch 247 is engaged. A torque of the input shaft 207 is then transmitted to the counter shaft 208 via the fourth-speed drive gear 237 and the fourth-speed driven gear 244. If the shift position sensor 69 detects the fifth speed, the fifth-speed clutch 248 is engaged. A torque of the input shaft 207 is then transmitted to the counter shaft 208 via the fifth-speed drive gear 238 and the fifth-speed driven gear 245.

Furthermore, if the shift position sensor 69 detects the reverse stage, the sleeve 252 operates so that the reverse driven gear 251 and the counter shaft 208 are engaged with each other. Therefore, a torque of the input shaft 207 is transmitted to the counter shaft 208 via the first-speed drive gear 236, the reverse idle gear, and the reverse driven gear 251. Thus, the transmission shown in FIG. 8 is designed such that a passenger selects a certain shift position and that a corresponding speed-change stage is changed as the shift position is switched to another shift position. That is, the transmission shown in FIG. 8 is designed such that the hydraulic control device 77 automatically performs operations of engaging and releasing the frictional engagement elements. Such a transmission is referred to as a manual-mode transmission (MMT).

If the frictional engagement elements corresponding to the aforementioned speed-change stage have been engaged so as to set the speed-change stage, power in the front wheel 63 is transmitted to the input shaft 207 via the counter shaft 208 and the clutch while the vehicle is coasting. The power transmitted to the input shaft 207 is transmitted to the turbine runner 13.

The control example shown in FIG. 1 can also be performed in a system having the power train shown in FIG. 8, the hydraulic circuit shown in FIG. 3, and the control system shown in FIG. 4. That is, a seventh control operation can be performed in step S3. The seventh control operation is designed such that a speed-change stage having a greater speed-change ratio than the speed-change stage before proceeding to step S3 is selected in step S3 as the speed-change stage of the transmission 205 even if the shift position sensor 69 has not detected a downshift operation of the transmission 205. By performing the seventh control operation, the rotation speed of the turbine runner 13 after proceeding to step S3 becomes higher than the rotation speed of the turbine runner 13 before proceeding to step S3. An improvement in fuel consumption is achieved for the same reason as in the case of the second control operation. It is possible that the first, third and fourth control operations are also performed in the MMT.

The control example shown in FIG. 1 can also be performed in a so-called manual transmission in which a passenger performs operations of switching speed-change stages and switching clutches disposed between a transmission and an engine. In this case, oil pumped by an oil pump can be supplied to the transmission via a hydraulic circuit so as to lubricate and cool the interior of the transmission. A pressure-regulating valve regulates the hydraulic pressure for delivering oil to a lubricating system. A linear solenoid valve (not shown) controls the hydraulic pressure at an output port of the pressure-regulating valve. Accordingly, if the duty ratio of the linear solenoid valve is controlled, the amount and temperature of oil returned from a drain port of the pressure-regulating valve to an oil pan can be controlled (the eighth control operation). The temperature of oil can be controlled for the same reason as in the case of the first control operation. The eighth control operation also achieves an improvement in fuel consumption as in the case of the first control operation.

If the temperature of oil is within a predetermined temperature range in step S3 of FIG. 1, control parameters such as a line pressure of the hydraulic circuit, an engaging pressure of the lock-up clutch 19, a clamping pressure applied to the belt 46, and the like can be controlled gradationally or continuously. By controlling these parameters continuously, a sudden change in deceleration is suppressed. It is preferable in step S3 of FIG. 1 that the degree of adjustment of the parameters be determined in accordance with the temperature of the oil.

In the power train shown in FIG. 8, it is possible that the first control operation is performed. That is, the line pressure in the oil passage 137A of the hydraulic control device 77 is increased by controlling the duty ratio of the linear solenoid valve 150. If the line pressure is increased by thus performing the first control operation, an improvement in fuel consumption is achieved for the same reason as in the case of the first control operation in the power train shown in FIG. 2.

In the power train shown in FIG. 8, it is possible that the third control operation is performed. That is, a speed-change ratio for generating an engine-braking force is set as the speed-change ratio of the transmission 205 after proceeding to step S3 if a speed-change ratio in which no engine-braking force is generated is set as the speed-change ratio of the transmission 205 before proceeding to step S3. If the rotation speed of the input shaft 207 is increased by thus performing the third control operation, an improvement in fuel consumption is achieved for the same reason as in the case of the third control operation in the power train shown in FIG. 2.

In the power train shown in FIG. 8, it is possible that the fourth control operation is performed. That is, if power in the front wheel 63 is transmitted to the turbine runner 13 via the final reducer 10, the transmission 205, and the input shaft 207 while the vehicle is coasting, an engaging pressure of the lock-up clutch 19 is increased. If the engaging pressure of the lock-up clutch 19 is increased by thus performing the fourth control operation, an improvement in fuel consumption can be achieved for the same reason as in the case where the fourth control operation is performed in the power train shown in FIG. 2.

Thus, the second to fifth control operations performed in step S3 of FIG. 1 can be described as a so-called regenerative warm-up system that raises the temperature of oil by transmitting kinetic energy in the front wheel 63, i.e., power in the front wheel 63 to the power-transmission system and converting it into thermal energy while the vehicle is coasting. It can be said that the first to fifth control operations performed in step S3 of FIG. 1 are designed to control a system associated with the functions of the power-transmission system so that the loss of energy (heat) generated by the system can be used to raise the temperature of hydraulic fluid.

It will now be described how the functional means shown in FIG. 1 correspond to the construction of the invention. The processes in step S1 to step S3 can be regarded as temperature controlling means of the invention. Engaged states, released states, and slipping states of the frictional engagement elements and engaging pressures of the frictional engagement elements can be regarded as states of engagement of the invention. In addition, the third speed and the fourth speed shown in FIG. 5 can be regarded as a predetermined speed-change ratio and another speed-change ratio of the invention, respectively. It is also possible to combine at least two of the control operations that are performed in step S3 of FIG. 1.

The control example shown in FIG. 1 can also be applied to a transmission that has a plurality of speed-change portions and that is designed to perform a speed-change operation in two or more of the speed-change portions, namely, a so-called simultaneous speed-change operation in the case where the speed-change ratio between an input member and an output member is switched, although such a transmission is not shown in the drawings. In this case, the processing in step S2 is performed to cause at least two of the frictional engagement elements to slip. The control example shown in FIG. 1 can also be performed in a vehicle (not shown) equipped with a power train that is designed such that power in at least one of an engine and an electric motor is transmitted to wheels via a hydrodynamic power-transmission system. That is, the amount of power loss in the electric motor during power transmission through the hydrodynamic power-transmission system can be reduced, and the amount of electric power required for driving the electric motor can be reduced. The control example can also be applied to a vehicle in which a fluid coupling that does not have the function of amplifying torque is employed as a hydrodynamic power-transmission system.

The first to eighth control operations are designed to raise the temperature of hydraulic fluid through control of the system while the vehicle is coasting, whereby the viscosity of hydraulic fluid in the hydrodynamic power-transmission system is reduced. Then, the shearing resistance of the contacting surfaces between one of the rotational members and hydraulic fluid is reduced. As a result, an improvement in fuel consumption is achieved. Also, the temperature of hydraulic fluid can be controlled without the necessity of providing a specially designed heat accumulator. Accordingly, there is no need to increase the number of parts in addition to the original system. Thus, it is possible to prevent structural complication of the device and suppress an increase in weight, size, and cost of the device. In addition, since the system associated with the functions of the power-transmission system is controlled when the vehicle is coasting, the acceleration performance of the vehicle remains unaffected.

In the illustrated embodiment, the controller (ECU 64) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. On the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A control apparatus comprising:
    a power-transmission system coupled to a driving-power source; and
    a temperature controller that controls a temperature of fluid supplied to the power-transmission system by controlling a subsystem of the power-transmission system while a vehicle in which the power-transmission system is installed is coasting.

2. The control apparatus according to claim 1, wherein the fluid is hydraulic fluid and the power-transmission system includes:
    a hydrodynamic power-transmission system coupled to the driving-power source, the hydrodynamic power-transmission system transmits power between one rotational member and another rotational member; and
    a transmission coupled to the another rotational member to receive power from the another rotational member.

3. The control apparatus according to claim 2, wherein the subsystem includes an oil passage through which hydraulic fluid pumped by an oil pump flows and an actuator for controlling a hydraulic pressure of the hydraulic fluid, and
    the temperature controller controls a temperature of the hydraulic fluid discharged from the oil passage by controlling the actuator.

4. The control apparatus according to claim 3, wherein the oil pump is driven by at least one of power transmitted from the driving-power source to the oil pump via the one rotational member and power transmitted from a power plant other than the driving-power source to the oil pump without passing through the one rotational member.

5. The control apparatus according to claim 2, wherein the subsystem includes a lock-up clutch that couples the one rotational member to the another rotational member and an oil pump that pumps the hydraulic fluid by being driven by power in the one rotational member, and
    the temperature controller controls a temperature of the hydraulic fluid by controlling an engaging pressure of the lock-up clutch so as to control power transmitted from the one rotational member to the oil pump if power in wheels of the vehicle is transmitted to the one rotational member via the transmission.

6. The control apparatus according to claim 2, wherein the temperature controller controls a temperature of the hydraulic fluid by controlling a speed-change ratio of the transmission so as to adjust a difference between a speed of the one rotational member and a speed of the another rotational member if power in wheels of the vehicle is transmitted to the another rotational member of the hydrodynamic power-transmission system via the transmission while the vehicle is coasting.

7. The control apparatus according to claim 2, wherein the subsystem includes frictional engagement elements whose states of engagement change so as to control a speed-change ratio of the transmission, and the temperature controller controls a temperature of the hydraulic fluid by controlling states of engagement of the frictional engagement elements.

8. The control apparatus according to claim 2, wherein the subsystem includes a plurality of frictional engagement elements whose states of engagement are changed simultaneously if a speed-change ratio of the transmission is switched from a predetermined speed-change ratio to another speed-change ratio, and the temperature controller controls a temperature of the hydraulic fluid by controlling a state of engagement of at least one of the frictional engagement elements so as to adjust frictional heat in at least one of the plurality of frictional engagement elements.

9. The control apparatus according to claim 2, wherein the subsystem includes a belt extending around an input rotational member and an output rotational member of the transmission, and the temperature controller controls a temperature of the hydraulic fluid by controlling a tensile force applied to the belt so as to adjust an exothermic state of the belt.

10. The control apparatus according to claim 1, wherein the power-transmission system includes a transmission; and the fluid is a lubricant that lubricates the transmission.

11. A method of controlling a temperature of fluid for a power-transmission system, comprising the steps of:

supplying the fluid to the power-transmission system;

determining whether or not a vehicle in which the power-transmission system is installed is coasting; and controlling a subsystem of the power-transmission system so as to control a temperature of the fluid if it is determined that the vehicle is coasting.

12. The method according to claim 11, wherein the power transmission system includes a hydrodynamic power-transmission system having one rotational member and another rotational member, and wherein the fluid is hydraulic fluid that transmits power from a driving-power source to a transmission.

13. The method according to claim 12, wherein the subsystem is controlled to adjust a hydraulic pressure of the hydraulic fluid and control a temperature of the hydraulic fluid.

14. The method according to claim 13, wherein the subsystem includes an oil passage through which the hydraulic fluid flows and an actuator that controls a hydraulic pressure of the hydraulic fluid, and the actuator is controlled to adjust the hydraulic pressure of the hydraulic fluid and to control the temperature of the hydraulic fluid.

15. The method according to claim 13, wherein the subsystem includes an oil pump that pumps the hydraulic fluid, and the hydraulic pressure of the hydraulic fluid is adjusted by controlling a speed of the oil pump.

16. The method according to claim 13, wherein the subsystem includes a lock-up clutch that couples the one rotational member to the another rotational member, the oil pump pumps the hydraulic fluid by being driven by power in the one rotational member, and the temperature of the hydraulic fluid is controlled by controlling an engaging pressure of the lock-up clutch so as to control power transmitted from the one rotational member to the oil pump if power in wheels of the vehicle is transmitted to the one rotational member via the transmission.

17. The method according to claim 13, wherein the subsystem is controlled to increase a hydraulic pressure of the hydraulic fluid and raise the temperature of the hydraulic fluid in comparison with the temperature of the hydraulic fluid at a moment prior to the performance of control by the subsystem.

18. The method according to claim 12, wherein the temperature of the hydraulic fluid is controlled by adjusting a difference between a speed of the one rotational member and a speed of the another rotational member.

19. The method according to claim 18, wherein the temperature of the hydraulic fluid is controlled by controlling a speed-change ratio of the transmission so as to adjust a difference between a speed of the one rotational member and a speed of the another rotational member if power in wheels of the vehicle is transmitted to the another rotational member of the hydrodynamic power-transmission system via the transmission while the vehicle is coasting.

20. The method according to claim 18, wherein the subsystem is controlled to increase a difference between a speed of the one rotational member and a speed of the another rotational member and raise the temperature of the hydraulic fluid in comparison with the temperature of the hydraulic fluid at a moment prior to the performance of control by the subsystem.

21. The method according to claim 12, wherein the subsystem includes frictional engagement elements whose states of engagement change so as to control a speed-change ratio of the transmission, and a temperature of the hydraulic fluid is controlled by controlling states of engagement of the frictional engagement elements so as to adjust frictional heat in the frictional engagement elements.

22. The method according to claim 12, wherein the subsystem includes a plurality of frictional engagement elements whose states of engagement are changed simultaneously if a speed-change ratio of the transmission is switched from a predetermined speed-change ratio to another speed-change ratio, and a temperature of the hydraulic fluid is controlled by controlling a state of engagement of at least one of the frictional engagement elements so as to adjust frictional heat in at least one of the frictional engagement elements.

23. The method according to claim 12, wherein the subsystem includes a belt extending around an input rotational member and an output rotational member of the transmission, and a temperature of the hydraulic fluid is controlled by controlling a tensile force applied to the belt so as to adjust an exothermic state of the belt.

24. The method according to claim 11, wherein the fluid is a lubricant that lubricates a transmission.

* * * * *